(12) United States Patent
Kim et al.

(10) Patent No.: US 10,001,972 B2
(45) Date of Patent: Jun. 19, 2018

(54) RANDOM IP GENERATION METHOD AND APPARATUS

(71) Applicant: KOREA INTERNET & SECURITY AGENCY, Seoul (KR)

(72) Inventors: Hwan Kuk Kim, Seoul (KR); Tae Eun Kim, Seoul (KR); Dae Il Jang, Seoul (KR); Eun Hye Ko, Seoul (KR); Jee Soo Jurn, Seoul (KR); Sa Rang Na, Seoul (KR); Eun Byul Lee, Seoul (KR)

(73) Assignee: KOREA INTERNET & SECURITY AGENCY, Seoul (KR)

(*) Notice: Subject to any disclaimer, the term of this patent is extended or adjusted under 35 U.S.C. 154(b) by 0 days. days.

(21) Appl. No.: 15/810,962

(22) Filed: Nov. 13, 2017

(65) Prior Publication Data
US 2018/0143807 A1    May 24, 2018

(30) Foreign Application Priority Data
Nov. 22, 2016 (KR) .......................... 10-2016-0155523

(51) Int. Cl.
*G06F 7/58* (2006.01)
*H04L 29/12* (2006.01)

(52) U.S. Cl.
CPC .......... *G06F 7/588* (2013.01); *H04L 61/2015* (2013.01); *H04L 61/2061* (2013.01); *H04L 61/6068* (2013.01)

(58) Field of Classification Search
CPC .. G06F 7/588; G06F 11/1484; G06F 11/2007; G06F 11/2038; G06F 11/2048; G06F 11/2097; G06F 2009/45562; G06F 2201/85; G06F 9/45533; G06F 9/45558; H04L 61/2061; H04L 61/6068; H04L 29/1232; H04L 29/12801; H04L 61/2007; H04L 61/2015; H04L 29/12783; H04L 61/2503; H04L 61/35; H04L 67/1029; H04L 67/1097; H04L 29/12226; H04L 29/12301; H04L 29/12311; H04L 29/12952; H04L 61/2076; H04L 61/2084;
(Continued)

(56) References Cited

U.S. PATENT DOCUMENTS 6,888,898 B1 * 5/2005 Chenes ................. G06F 3/0231
375/219
7,058,973 B1 * 6/2006 Sultan ............... H04L 29/12009
709/217
(Continued)

FOREIGN PATENT DOCUMENTS

KR    10-2006-0022937 A    3/2006

*Primary Examiner* — Greg C Bengzon
(74) *Attorney, Agent, or Firm* — Studebaker & Brackett PC

(57) ABSTRACT

Provided is an Internet protocol (IP) generation method. The method is performed by an IP generation apparatus and includes: forming a plurality of initialized partial numbers by dividing a decimal number indicating a count of IP addresses that can be generated; changing the partial numbers according to a predetermined rule; generating an IP decimal number by connecting the changed partial numbers; generating a random IP address from the IP decimal number; and generating a plurality of different random IP addresses by sequentially repeating the changing of the partial numbers, the generating of the IP decimal number and the generating of the random IP address.

7 Claims, 13 Drawing Sheets

(1) a1=01, a2= 32, a3=98, a4=95, a5=54

(2) ip_decimal = a1*100000000 + a2*1000000 + a3*10000 + a4*100 + a5;

(3) ip_decimal = 01*100000000 + 32*1000000 + 98*10000 + 95*100 + 54;

(4) ip_decimal = 0,132,989,554

(5) IP address: 7. 237. 66. 114

OPERATION EXAMPLE 1 (300)

(58) Field of Classification Search
CPC ..... H04L 61/6077; H04L 67/08; H04L 69/16; H04L 69/161; H04L 69/162; H04L 69/329; H04L 29/12207; H04L 29/12216; H04L 29/12264; H04L 61/20; H04L 61/2046; H04L 61/6004
See application file for complete search history.

(56) References Cited

U.S. PATENT DOCUMENTS

| | | | | |
|---|---|---|---|---|
| 7,281,036 | B1* | 10/2007 | Lu | H04L 29/12028 709/220 |
| 8,095,677 | B1* | 1/2012 | Kucherawy | H04L 61/35 370/253 |
| 8,769,057 | B1* | 7/2014 | Breau | H04L 61/103 709/220 |
| 8,788,707 | B1* | 7/2014 | Su | H04L 61/20 709/224 |
| 9,294,435 | B2* | 3/2016 | Ivanov | H04L 61/1511 |
| 9,544,228 | B2* | 1/2017 | Cheng | H04L 45/74 |
| 9,641,598 | B1* | 5/2017 | Yuhan | H04L 67/00 |
| 9,813,309 | B2* | 11/2017 | Li | H04L 43/00 |
| 2002/0038380 | A1* | 3/2002 | Brawn | H04L 29/12283 709/238 |
| 2003/0048806 | A1* | 3/2003 | Haartsen | H04L 29/12009 370/475 |
| 2003/0053441 | A1* | 3/2003 | Banerjee | H04L 29/12216 370/352 |
| 2005/0027778 | A1* | 2/2005 | Dimitrelis | H04L 29/1232 709/200 |
| 2005/0185595 | A1* | 8/2005 | Lee | H04L 12/2803 370/252 |
| 2005/0251552 | A1* | 11/2005 | Champel | H04L 29/1232 709/204 |
| 2007/0143384 | A1* | 6/2007 | Muranaka | G06F 7/588 708/250 |
| 2010/0138551 | A1* | 6/2010 | Degaonkar | H04L 29/12066 709/228 |
| 2012/0297089 | A1* | 11/2012 | Carothers | H04L 61/2517 709/245 |
| 2013/0111065 | A1* | 5/2013 | Donley | H04L 69/22 709/245 |
| 2013/0179580 | A1* | 7/2013 | Short | H04L 61/2592 709/227 |
| 2014/0181274 | A1* | 6/2014 | Bazin | H04L 61/2015 709/220 |
| 2014/0280902 | A1* | 9/2014 | Szamonek | H04L 61/2007 709/224 |
| 2015/0215274 | A1* | 7/2015 | Imadali | H04L 61/6059 709/245 |
| 2015/0264008 | A1* | 9/2015 | Li | G06Q 10/10 709/245 |
| 2015/0312212 | A1* | 10/2015 | Holmes | H04L 61/6059 709/245 |
| 2016/0087936 | A1* | 3/2016 | Akyurek | H04L 61/2015 709/226 |
| 2017/0054679 | A1* | 2/2017 | Choi | H04L 61/6004 |
| 2017/0214709 | A1* | 7/2017 | Maestas | H04L 63/1433 |
| 2017/0353427 | A1* | 12/2017 | Kant | H04L 61/2007 |
| 2017/0359303 | A1* | 12/2017 | Szamonek | H04L 61/2061 |

* cited by examiner

FIG. 4

```
(01) Initialize a1, a2, a3, a4, a5 = 0;
(02) change_IP_to_decimal(ip_deciaml, ip);

(03) {while(1){
(04)         if(a1 == 0) {
(05)                 a1=42;
(06)                 if(a2 ==0){
(07)                         a2 == 99;
(08)                         if(a3 == 0){
(09)                                 a3 = 99;
(10)                                 if(a4 == 0){
(11)                                         a4 = 99;
(12)                                         if(a5 == 0){
(13)                                                 a5 = 99;
(14)                                         }else a5 = a5 - 1;
(15)                                 }else a4 = a4 - 1;
(16)                         }else a3 = a3 - 1;
(17)                 }else a2 = a2 -1;
(18)         }else a1 = a1 - 1;
(19)         ip_decimal = a1*100000000 + a2*1000000 + a3*10000 + a4*100 + a5;
(20)         if (ip_decimal > 4294967295) {
(21)                 call again;
(22)                 return;
(23)         }
(24)         change_decimal_to_IP(ip_deciaml, ip);
(25)         If (ip_decimal == 0) exit;
(26)}}}
```

EXAMPLE 1 (200)

FIG. 6

The number of address : 8 bit
Decimal number : 255 = (2 ^ 8)-1        } a

[PROCESS OF CHANGING PARTIAL NUMBERS]

| | | | | | | | | | |
|---|---|---|---|---|---|---|---|---|---|
| 25 9 | 25 8 | 25 7 | 25 6 | 25 5 | 25 4 | 25 3 | 25 2 | 25 1 | 25 0 |
| 24 9 | 24 8 | 24 7 | 24 6 | 24 5 | 24 4 | 24 3 | 24 2 | 24 1 | 24 0 |
| 23 9 | 23 8 | 23 7 | 23 6 | 23 5 | 23 4 | 23 3 | 23 2 | 23 1 | 23 0 |
| 22 9 | 22 8 | 22 7 | 22 6 | 22 5 | 22 4 | 22 3 | 22 2 | 22 1 | 22 0 |
| 21 9 | 21 8 | 21 7 | 21 6 | 21 5 | 21 4 | 21 3 | 21 2 | 21 1 | 21 0 |
| 20 9 | 20 8 | 20 7 | 20 6 | 20 5 | 20 4 | 20 3 | 20 2 | 20 1 | 20 0 |
| 19 9 | 19 8 | 19 7 | 19 6 | 19 5 | 19 4 | 19 3 | 19 2 | 19 1 | 19 0 |
| 18 9 | 18 8 | 18 7 | 18 6 | 18 5 | 18 4 | 18 3 | 18 2 | 18 1 | 18 0 |
| 17 9 | 17 8 | 17 7 | 17 6 | 17 5 | 17 4 | 17 3 | 17 2 | 17 1 | 17 0 |
| 16 9 | 16 8 | 16 7 | 16 6 | 16 5 | 16 4 | 16 3 | 16 2 | 16 1 | 16 0 |
| 15 9 | 15 8 | 15 7 | 15 6 | 15 5 | 15 4 | 15 3 | 15 2 | 15 1 | 15 0 |
| 14 9 | 14 8 | 14 7 | 14 6 | 14 5 | 14 4 | 14 3 | 14 2 | 14 1 | 14 0 |
| 13 9 | 13 8 | 13 7 | 13 6 | 13 5 | 13 4 | 13 3 | 13 2 | 13 1 | 13 0 |
| 12 9 | 12 8 | 12 7 | 12 6 | 12 5 | 12 4 | 12 3 | 12 2 | 12 1 | 12 0 |
| 11 9 | 11 8 | 11 7 | 11 6 | 11 5 | 11 4 | 11 3 | 11 2 | 11 1 | 11 0 |
| 10 9 | 10 8 | 10 7 | 10 6 | 10 5 | 10 4 | 10 3 | 10 2 | 10 1 | 10 0 |
| 09 9 | 09 8 | 09 7 | 09 6 | 09 5 | 09 4 | 09 3 | 09 2 | 09 1 | 09 0 |
| 08 9 | 08 8 | 08 7 | 08 6 | 08 5 | 08 4 | 08 3 | 08 2 | 08 1 | 08 0 |
| 07 9 | 07 8 | 07 7 | 07 6 | 07 5 | 07 4 | 07 3 | 07 2 | 07 1 | 07 0 |
| 06 9 | 06 8 | 06 7 | 06 6 | 06 5 | 06 4 | 06 3 | 06 2 | 06 1 | 06 0 |
| 05 9 | 05 8 | 05 7 | 05 6 | 05 5 | 05 4 | 05 3 | 05 2 | 05 1 | 05 0 |
| 04 9 | 04 8 | 04 7 | 04 6 | 04 5 | 04 4 | 04 3 | 04 2 | 04 1 | 04 0 |
| 03 9 | 03 8 | 03 7 | 03 6 | 03 5 | 03 4 | 03 3 | 03 2 | 03 1 | 03 0 |
| 02 9 | 02 8 | 02 7 | 02 6 | 02 5 | 02 4 | 02 3 | 02 2 | 02 1 | 02 0 |
| 01 9 | 01 8 | 01 7 | 01 6 | 01 5 | 01 4 | 01 3 | 01 2 | 01 1 | 01 0 |
| 00 9 | 00 8 | 00 7 | 00 6 | 00 5 | 00 4 | 00 3 | 00 2 | 00 1 | 00 0 |

EXAMPLE 2 (210)

EXAMPLE 3 (220)

(1) a1=01, a2= 32, a3=98, a4=95, a5=54

(2) ip_decimal = a1*100000000 + a2*1000000 + a3*10000 + a4*100 + a5;

(3) ip_decimal = 01*100000000 + 32*1000000 + 98*10000 + 95*100 + 54;

(4) ip_decimal = 0,132,989,554

(5) IP address: 7. 237. 66. 114

OPERATION EXAMPLE 1 (300)

(1) Decimal value: 4,294,697,295 = (2^32)-1

(2) binary value : 11111111111111111111111111111111

(3) binary value : 11111111/ 11111111/ 11111111/ 11111111

(4) IP address: 255. 255. 255. 255

OPERATION EXAMPLE 2 (310)

(1) Decimal value : 2,130,771,713

(2) binary value : 01111111000000001111111100000001

(3) binary value : 01111111/ 00000000/ 11111111/ 00000001

(4) IP address: 127. 0. 255. 1

OPERATION EXAMPLE 3 (320)

(1) a1=01, a2= 32, a3=98, a4=95, a5=54

(2) ip_decimal = 01*100000000 + 32*1000000 + 98*10000 + 95*100 + 54;
(3) ip_decimal = 0,132,989,554

(4) binary value = 11111101101010000100110010
(5) binary value = 00000111/ 11101101/ 01000010/ 01110010

(6) IP address: 7. 237. 66. 114

OPERATION EXAMPLE 4 (330)

FIG. 13

|  |  |  | CONVENTIONAL ALGORITHM | INVENTIVE CONCEPT |
|---|---|---|---|---|
| SPACE COMPLEXITY | SYSTEM RESOURCE USAGE | CPU | 99% - 100% | |
| | | Memory | 6272Kbyte | 444-624Kbyte |
| TIME COMPLEXITY | | | 15minutes 30seconds | 13.53seconds |

PERFORMANCE COMPARISON TABLE (400)

RANDOM IP GENERATION METHOD AND APPARATUS

This application claims the benefit of Korean Patent Application No. 10-2016-0155523, filed on Nov. 22, 2016, in the Korean Intellectual Property Office, the disclosure of which is incorporated herein by reference in its entirety.

BACKGROUND

1. Field

The present inventive concept relates to a random Internet protocol (IP) generation method and apparatus, and more particularly, to a method and apparatus for generating random IP addresses, specifically, all IP addresses in a specific IP address system.

2. Description of the Related Art

The number of Internet protocol (IP) addresses that can be generated under a particular IP address system depends on the number of bits of an IP address. For example, the most commonly used IPv4 address consists of 32 bits. Therefore, a total of 2^32 IP addresses can be generated under the IPv4 address system. In addition, since an IPv6 address consists of 128 bits, a total of 2^128 IP addresses can be generated under the IPv6 address system.

When a device is connected to a network, it is assigned a unique IP address. In order to scan various devices connected to the network and collect information, it is necessary to check whether all IP addresses that can be generated have been activated. To this end, it is necessary to generate IP addresses at random. This is because, when sequential IP addresses are generated and scanned, work may be concentrated in a specific IP band, resulting in a bottleneck or shutoff by security equipment.

Therefore, there is a need for a technique for generating random IP addresses in an arbitrary order. To generate random IP addresses, an IP random generation method (Zmap) using an advanced encryption standard (AES)-based permutation algorithm or an IP random generation method (Masscan) using a data encryption standard (DES) S-box-based Blackrock permutation algorithm has been used. However, the use of the permutation algorithm increases time and space complexity.

In this regard, there is a need for an IP generation method and apparatus with reduced time and space complexity.

SUMMARY

Aspects of the inventive concept provide an Internet protocol (IP) generation and method and apparatus having improved time and space complexity compared with a conventional method.

Aspects of the inventive concept also provide an IP generation method and apparatus having an IP coverage of 100% by generating all possible IP addresses in an arbitrary order.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided an Internet protocol (IP) generation method performed by an IP generation apparatus, the IP generation method comprises forming a plurality of initialized partial numbers by dividing a decimal number indicating the number a count of IP addresses that can be generated, changing the partial numbers according to a predetermined rule, generating an IP decimal number by connecting the changed partial numbers, generating a random IP address from the IP decimal number, and generating a plurality of different random IP addresses by sequentially repeating the changing of the partial numbers, the generating of the IP decimal number and the generating of the random IP address.

According to another aspect of the inventive concept, there is provided an Internet protocol (IP) generation method performed by an IP generation apparatus, wherein the forming of the initialized partial numbers comprises, dividing the decimal number indicating the number the count of IP addresses that can be generated into partial numbers of first through n-th slots in order of decreasing digits place and initializing each of the partial numbers of the second through n-th slots to a maximum value and forming the initialized partial numbers comprising the partial number of the first slot and the initialized partial numbers of the second through n-th slots, wherein n is a natural number of 2 or more.

According to another aspect of the inventive concept, there is provided an Internet protocol (IP) generation method performed by an IP generation apparatus, wherein the changing of the partial numbers according to the predetermined rule comprises reducing a partial number of only an m-th slot which is any one of the first through n-th slots, wherein $1 \le m \le n$.

According to another aspect of the inventive concept, there is provided an IP generation apparatus, the IP generation apparatus comprises one or more processors, a memory which loads a computer program to be executed by the processors and a storage, wherein the computer program comprises an operation of forming a plurality of initialized partial numbers by dividing a decimal number indicating a count of IP addresses that can be generated, an operation of changing the partial numbers according to a predetermined rule, an operation of generating an IP decimal number by connecting the changed partial numbers, an operation of generating a random IP address from the IP decimal number and an operation of generating a plurality of different random IP addresses by sequentially repeating the operation of changing the partial numbers, the operation of generating the IP decimal number and the operation of generating the random IP address.

According to another aspect of the inventive concept, there is provided an Internet protocol (IP) generation method performed by an IP generation apparatus, wherein the reducing of the partial number of only the m-th slot comprises, reducing the partial number of the m-th slot if the partial number of the m-th slot can be reduced and reinitializing the partial number of the m-th slot to an initialized partial number of the m-th slot, increasing m by 1, and then reducing the partial number of the m-th slot if the partial number of the m-th slot cannot be further reduced.

According to another aspect of the inventive concept, there is provided an Internet protocol (IP) generation method performed by an IP generation apparatus, wherein the generating of the IP decimal number comprises, multiplying the partial numbers by a plurality of predetermined numbers, respectively and generating the IP decimal number by adding the partial numbers multiplied by the predetermined numbers.

According to another aspect of the inventive concept, there is provided an Internet protocol (IP) generation method, wherein the generating of the random IP address is performed when the IP decimal number is less than the decimal number indicating the count of IP addresses that can be generated.

According to another aspect of the inventive concept, there is provided an Internet protocol (IP) generation method, wherein the generating of the random IP address comprises, converting the IP decimal number into a binary number, dividing the binary number into a plurality of 8-bit units, starting from a first digit and generating an IP address by converting each of the 8-bit units into a decimal number.

According to another aspect of the inventive concept, there is provided an Internet protocol (IP) generation method, wherein the generating of the random IP address is performed as many times as the count of IP addresses that can be generated.

According to another aspect of the inventive concept, there is provided a computer program coupled to a computing device and executed to perform an IP generation method, the computer program comprises, forming a plurality of initialized partial numbers by dividing a decimal number indicating a count of IP addresses that can be generated, changing the partial numbers according to a predetermined rule, generating an IP decimal number by connecting the changed partial numbers, generating a random IP address from the IP decimal number and generating a plurality of different random IP addresses by sequentially repeating the changing of the partial numbers, the generating of the IP decimal number and the generating of the random IP address.

BRIEF DESCRIPTION OF THE DRAWINGS

These and/or other aspects will become apparent and more readily appreciated from the following description of the embodiments, taken in conjunction with the accompanying drawings in which:

FIG. 4 illustrates a pseudo code as an example of an IP generation method according to an embodiment;

FIG. 6 illustrates a process of changing a plurality of partial numbers when there are two slots, which is referred to in some embodiments:

FIG. 13 is a table comparing the performance of a conventional algorithm and the performance of an IP generation method according to an embodiment.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, embodiments will be described in greater detail with reference to the attached drawings.

Figure 1:
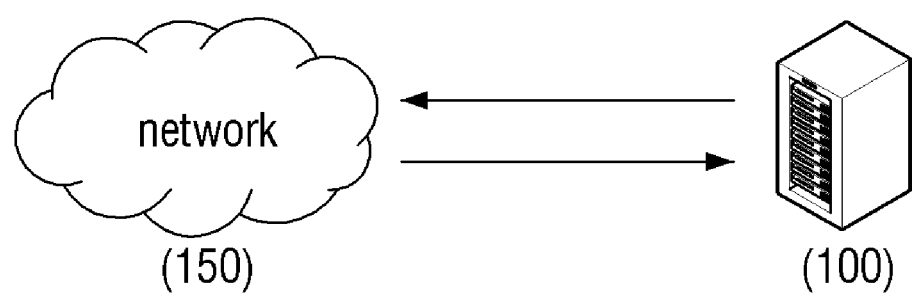
FIG. 1 illustrates the configuration of an Internet protocol (IP) generation system according to an embodiment.

FIG. 1 illustrates the configuration of an Internet protocol (IP) generation system according to an embodiment.

Referring to FIG. 1, the IP generation system may consist of a network 150 and an IP generation apparatus 100. The IP generation apparatus 100 may scan various devices connected to the network 150 and generate and scan IP addresses, to which the various devices are connected, in order to collect information about the various devices.

The IP generation apparatus 100 may determine the number of IP addresses (a count of IP addresses) that can be generated according to an IP address system of the network 150 and generate the determined number of IP addresses. Then, for example, a scanning device or an information collecting device may perform a scanning operation or an information collecting operation on the generated IP addresses. However, the fields in which the generated IP addresses are utilized are not limited to the above examples. The generated IP addresses can be utilized in any field that requires information about all IP addresses that can be generated in an arbitrary order, and the purpose of utilization of the generated IP addresses can be the purpose of IP generation of the IP generation apparatus 100.

Figure 2:
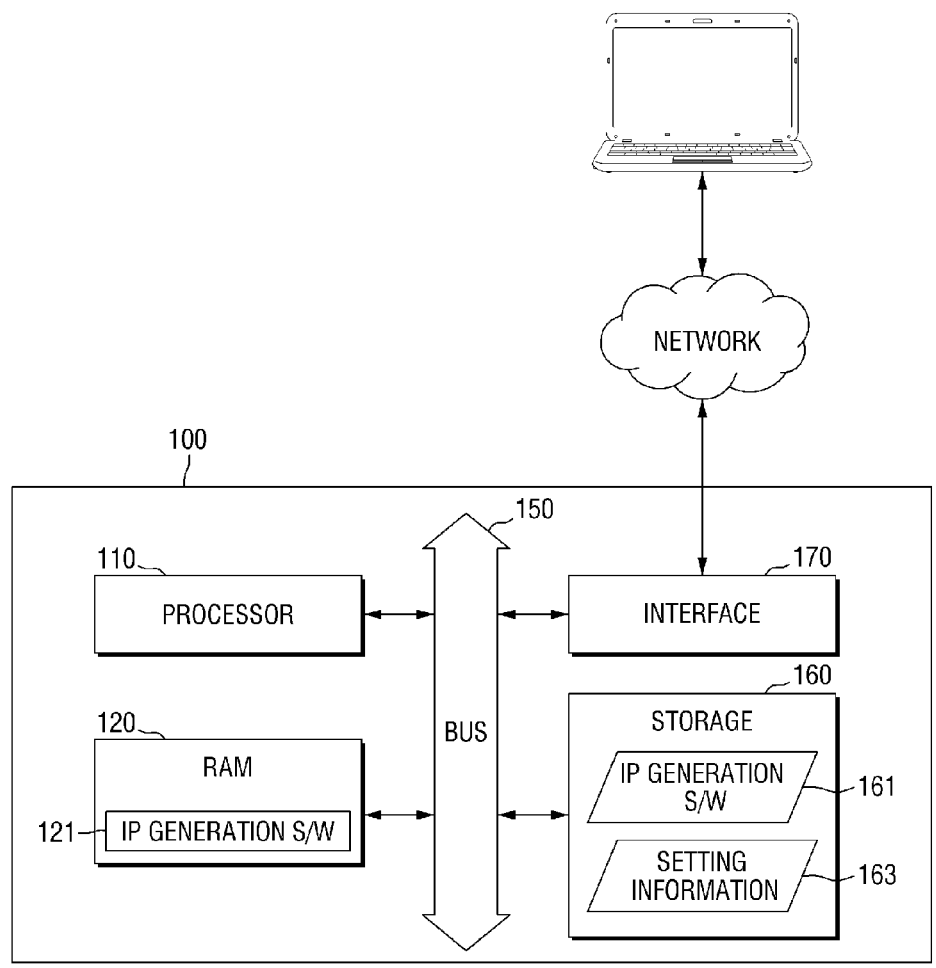
FIG. 2 illustrates the hardware configuration of an IP generation apparatus according to an embodiment.

The operation and structure of the IP generation apparatus 100 will now be described with reference to FIG. 2. FIG. 2 illustrates the hardware configuration of an IP generation apparatus 100 according to an embodiment.

Referring to FIG. 2, the IP generation apparatus 100 may include one or more processors 110, a memory 120, a storage 160, and an interface 170. The processors 110, the memory 120, the storage 160, and the interface 170 transmit and receive data via a system bus 150.

The processors 110 execute an IP generation program 121 loaded in the memory 120, and the memory 120 loads the IP generation program 121 from the storage 160.

As the IP generation program 121 is executed, the IP generation apparatus 100 may perform an operation of forming a plurality of initialized partial numbers by dividing a decimal number indicating the number of IP addresses that can be generated, an operation of changing the partial numbers according to a predetermined rule, an operation of generating an IP decimal number by connecting the changed partial numbers, and an operation of generating a random IP from the IP decimal number.

The IP generation apparatus 100 may perform an operation of generating a plurality of different random IP addresses by sequentially repeating the operation of forming the initialized partial numbers, the operation of forming the IP decimal number and the operation of generating the random IP from the IP decimal number.

Each component described above with reference to FIG. 2 may be implemented as a software component or a hardware component such as a field programmable gate array (FPGA) or application-specific integrated circuit (ASIC). However, the components are not limited to the software or hardware components and may be configured to reside on the addressable storage medium or configured to execute one or more processors. The functionality provided for in the components may be combined into fewer components or further separated into additional components.

Figure 3:
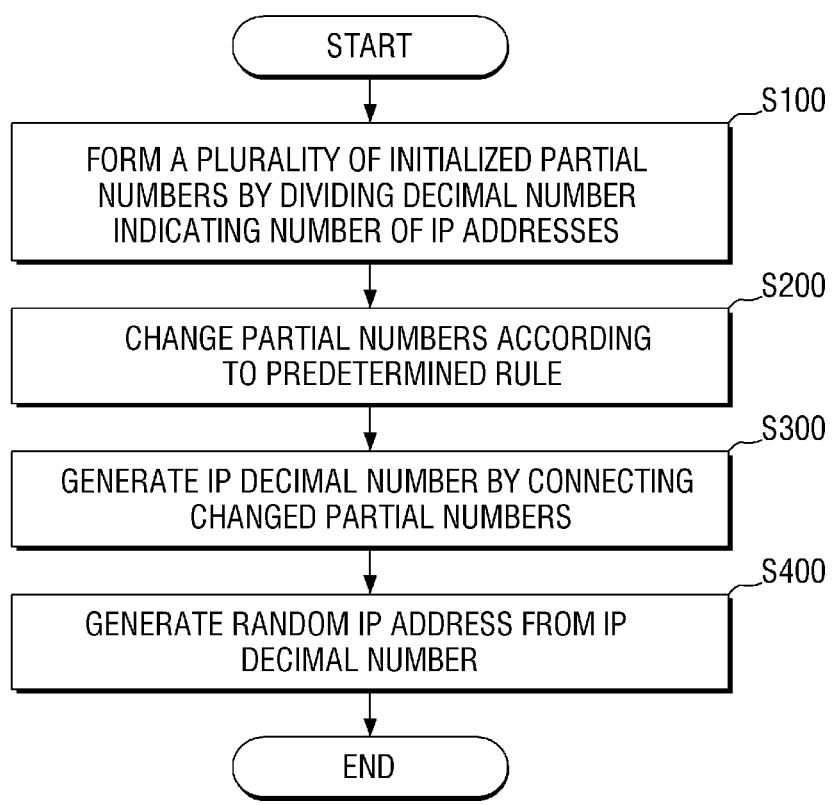
FIG. 3 is a flowchart illustrating an IP generation method according to an embodiment.

FIG. 3 is a flowchart illustrating an IP generation method according to an embodiment. An IP generation process will now be described with reference to FIG. 3.

The IP generation apparatus 100 may form a plurality of initialized partial numbers by dividing a decimal number indicating the number of IP addresses that can be generated (operation S100) and change the initialized partial numbers according to a predetermined rule (operation S200). The IP generation apparatus 100 may generate an IP decimal number by connecting the changed partial numbers (operation S300) and generate a random IP address from the generated IP decimal number (operation S400).

The IP generation apparatus 100 may generate a plurality of different random IP addresses by repeating operations S200, S300 and S400.

In operation S100, the decimal number indicating the number of IP addresses that can be generated is a decimal representation of a maximum number of IP addresses that can be generated in a corresponding IP address system. For example, the decimal number is $2^{32}$=4,294,967,296 in an IPv4 address system and $2^{128}$ in an IPv6 address system.

In operation S100, the partial numbers indicate a plurality of subsets of the decimal number generated as a result of dividing the decimal number in units of a predetermined number. For example, if the decimal number is 4,294,967,296 and the predetermined number unit is two, the decimal number may be divided into partial numbers of 42/94/96/72/96. For example, if the decimal number is 4,294,967,296 and the predetermined number unit is four, the decimal number may be divided into partial numbers of 4294/9672/96.

In operation S100, the IP generation apparatus 100 may initialize the partial numbers. The initialization process will be described later with reference to FIGS. 4 through 7. In addition, the process in which the IP generation apparatus 100 changes the partial numbers according to the predetermined rule in operation S200 will be described later with reference to FIG. 4 through FIG. 7, together with the initialization process.

In operation S400, the IP generation apparatus 100 may generate the random IP from the IP decimal number. This process will be described later with reference to FIGS. 8 through 12. According to an embodiment, the IP generation apparatus 100 may generate, in an arbitrary order, as many IP addresses as the number of IP addresses that can be generated.

FIG. 4 illustrates a pseudo code as an example of an IP generation method according to an embodiment.

In FIG. 4, a case where IP addresses are generated in the IPv4 address system and where a predetermined number unit used to form partial numbers is two is illustrated.

Since an IP address consists of 32 bits, a total of $2^{32}$. i.e., 4,294,967,296 IP addresses can be generated. In addition, since an IP address consists of numbers starting from 0, IP addresses of 0 to 4,294,967,295 can be generated. Thus, a largest address value is 4,294,967,295, and partial numbers may be formed based on this value.

Since an IP generation apparatus will form partial numbers, each having two digits, partial numbers of 42/94/96/72/95 will be formed. Each of a1 through a5 in line (01) indicates a variable space in which a partial number is to be stored. The variables a1 through a5 may be initialized to zero.

Through line (02), the IP generation apparatus may calculate the number of IP addresses that can be generated according to the IP address system or obtain a calculated value. Line (02) can be omitted.

In operation S100 of FIG. 3, the IP generation apparatus forms a plurality of initialized partial numbers. Specifically, the IP generation apparatus may divide a decimal number indicating the number of IP addresses that can be generated into partial numbers of first through $n^{th}$ slots (where n is a natural number of 2 or more) in order of decreasing digits place and initialize each of the partial numbers of the second through $n^{th}$ slots to a maximum value of digits constituting the partial number.

In the example of FIG. 4, the IP generation apparatus may divide 4,294,967,295, which is a value obtained by subtracting 1 from a decimal number of 4,294,967,296, into a total of five slots. A first slot is 42, a second slot is 94, a third slot is 96, a fourth slot is 72, and a fifth slot is 95.

Referring to lines (04) through (18), if each of the variables a1 through a5 has a value of 0, the IP generation apparatus may initialize the values of the first through fifth slots to 42, 99, 99, 99, and 99, respectively. That is, the first slot may be initialized to 42 which is the first two digits of the decimal number, and the remaining second through fifth slots may be initialized to 99 which is the maximum value of two digits constituting each of the partial numbers. Thus, IP addresses can be generated using 42,299,999,999 as an initial value.

In operation S200 of FIG. 3, the IP generation apparatus may change a plurality of partial numbers according to a predetermined rule. Operation S200 corresponds to lines (04) through (18). The IP generation apparatus may generate a decimal number for generating an IP by continuously reducing the value of one of the first through fifth slots by 1.

Figure 5:
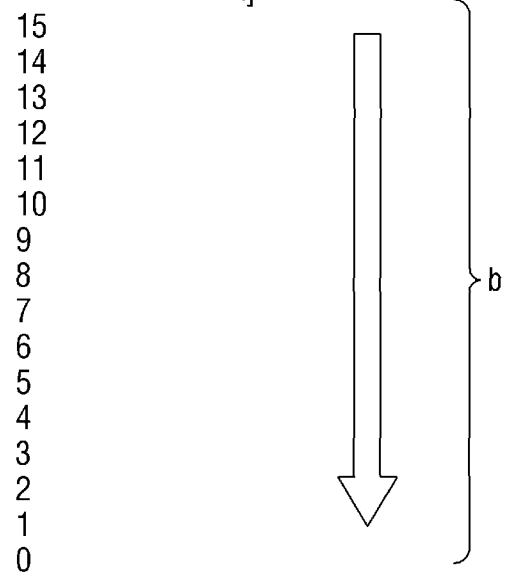
FIG. 5 illustrates a process of changing a plurality of partial numbers when there is one slot, which is referred to in some embodiments.

An example of FIG. 5 will now be described. FIG. 5 illustrates a process of changing a plurality of partial numbers when there is one slot, which is referred to in some embodiments.

In example 1 200, there is one slot having two digits. This may be a case where an IP address consists of 4 bits. Although such a case does not exist in reality, it will be used as an example for ease of description (see area a).

An arrow indicates the order in which a partial number is changed. Area b shows generated IP decimal numbers. Possible IP addresses are 0 to 15, and a first slot may be initialized to 15.

The value of the first slot may be continuously reduced by 1 from the initial value of 15. Thus, the partial number may be changed in the order of 15, 14, . . . . . . , 2, 1, 0.

An example of FIG. 6 will now be described. FIG. 6 illustrates a process of changing a plurality of partial numbers when there are two slots, which is referred to in some embodiments.

In example 2 210, there are two slots, each having two digits. This may be a case where an IP address consists of 8 bits (see area a).

An arrow indicates the order in which a plurality of partial numbers are changed. Area b shows the order in which a plurality of partial numbers are changed. Possible IP addresses are 0 to 255. Therefore, a partial number of 25 may be formed in a first slot, and a partial number of 5 may be formed in a second slot. Since the second slot is initialized to the maximum value of one digit, the initial value of the second slot may be 9.

Therefore, the initial values of the partial numbers are illustrated as "25 9" at a top left corner of area b. The initial values "25" and "9" are the values of the first slot and the second slot, respectively.

In operation S200 of FIG. 3, the IP generation apparatus may change a plurality of partial numbers according to a predetermined rule. Specifically, in operation S200, the IP generation apparatus may reduce a partial number of only an $m^{th}$ slot (1≤m≤n) which is any one of the first through $n^{th}$ slots. That is, the value of only one slot may be changed. For example, the IP generation apparatus may reduce the value of each slot by 1.

More specifically, the IP generation apparatus may reduce the partial number of the $m^{th}$ slot if the partial number of the $m^{th}$ slot can be reduced. If the partial number of the $m^{th}$ slot can no longer be reduced, the IP generation apparatus may reinitialize the partial number of the $m^{th}$ slot to the initialized partial number of the $m^{th}$ slot, increase m by 1, and then reduce the partial number of the $m^{th}$ slot.

In example 2 210 of FIG. 6, the IP generation apparatus may continuously reduce the partial number 25 of the first slot by 1. Since the IP generation apparatus changes the value of only one slot, the partial number of the second slot is not changed when the partial number of the first slot is changed. Here, the value of m is 1.

Therefore, the IP generation apparatus may generate IP decimal numbers in the order of 25 9, 24 9, . . . . . . , 01 9, 00 9. At 00 9, the value of the first slot is 0. Thus, the value of the first slot cannot be further reduced. This is because an IP address consists of numbers ranging from 0 to 255.

Therefore, the IP generation apparatus may reinitialize the first slot to 25 which is the initial partial number of the first slot, increase the value of m by 1, and then reduce the partial number of the second slot by 1. Then, the IP generation apparatus may repeat the above process for "25 8."

Through the repetition of this process, a plurality of partial numbers ranging from 259 to 000 can be generated.

Here, the values that can be IP addresses are 0 to 255. Therefore, no IP address can be generated from 259, 258, 257, and 256 among the partial numbers.

Figure 7:
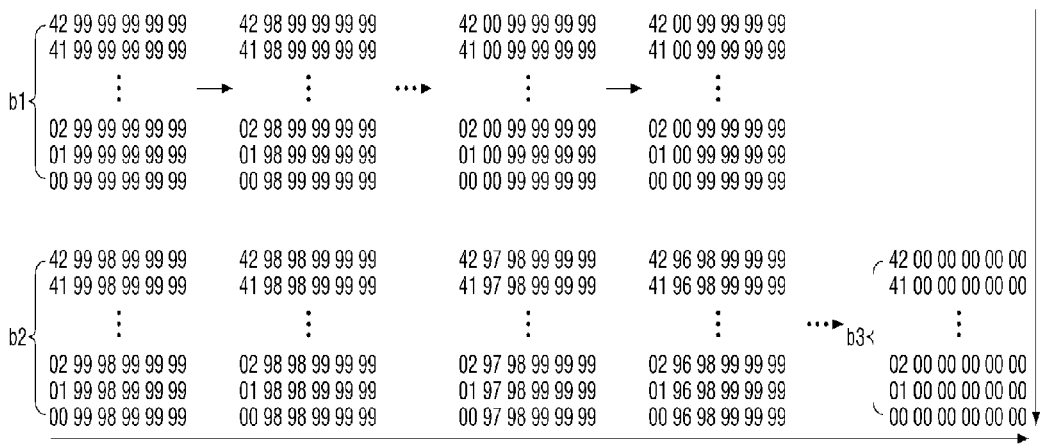
FIG. 7 illustrates a process of changing a plurality of partial numbers for a 32-bit IP address, which is referred to in some embodiments.

A process of changing a plurality of partial numbers in the IPv4-based 32-bit address system will now be described with reference to FIG. 7. FIG. 7 illustrates a process of changing a plurality of partial numbers for a 32-bit IP address, which is referred to in some embodiments.

In FIG. 7, a decimal number indicating the number of IP addresses is $2^{23}$, i.e., 4,294,967,296 (see area a). Assuming that the number of digits constituting each partial number is 2, the decimal number may be divided into a first slot of 42, a second slot of 94, a third slot of 96, a fourth slot of 72, and a fifth slot of 95.

Therefore, the IP generation apparatus may initialize the first slot to 42 and initialize each of the second through fifth slots to 99 which is the maximum value of two digits. The IP generation apparatus may change the partial numbers by continuously reducing the value of the first slot by 1 from 4,999,999,999.

Referring to area b1, the IP generation apparatus may change the partial numbers from 42 99 99 99 99 99 to 00 99 99 99 99 99 by reducing the value of the first slot. Here, since the value of the first slot is 0, it cannot be further reduced. Therefore, the IP generation apparatus may reduce the value of the second slot by 1 by increasing the value of m by 1 and reinitialize the value of the first slot to 42. The result is illustrated at a top left corner of area b2.

If the same process is repeated, the partial numbers become 00 00 00 00 00. When the partial numbers are 00 00 00 00 00, the operation of changing the partial numbers may be stopped. Therefore, area b3 may be the last stage.

Whenever the partial numbers are changed, the IP generation apparatus may generate an IP decimal number by connecting the partial numbers. This will now be described with reference to FIGS. 8 and 9.

Figure 8:
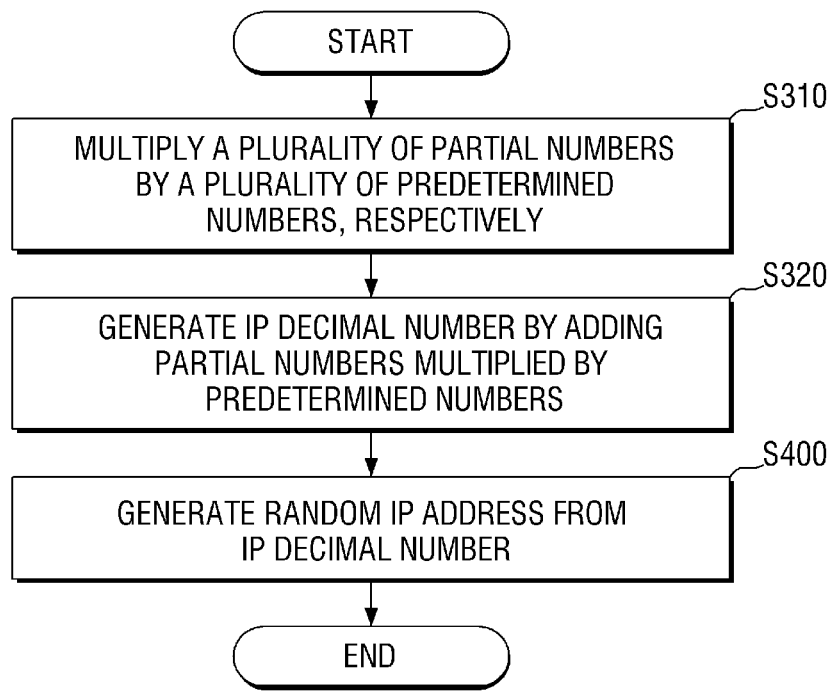
FIG. 8 is a flowchart illustrating a process of generating an IP decimal number, which is referred to in some embodiments.
Figure 9:
FIG. 9 illustrates a process of generating an IP decimal number, which is referred to in some embodiments.
Figure 9:

FIG. 8 is a flowchart illustrating a process of generating an IP decimal number, which is referred to in some embodiments. FIG. 9 illustrates a process of generating an IP decimal number, which is referred to in some embodiments.

An IP generation apparatus may multiply a plurality of partial numbers by a plurality of predetermined numbers, respectively (operation S310) and generate an IP decimal number by adding the partial numbers multiplied by the predetermined numbers (operation S320). The IP generation apparatus may generate a random IP from the generated IP decimal number (operation S400).

For example, there may be a plurality of partial numbers of 01 in a first slot a1, 32 in a second slot a2, 98 in a third slot a3, 95 in a fourth slot a4, and 54 in a fifth slot a5. Referring to operation example 1 300, in order to generate an IP decimal number from the above partial numbers, a1 should be multiplied by $10^8$, a2 by $10^6$, a3 by $10^4$, a4 by $10^2$, and a5 by 1. If all of the partial numbers multiplied by the respective numbers are added together, an IP decimal number of 0,131,989,554 can be generated. The IP generation apparatus can generate a random IP address of 7.237.66.114 from the IP decimal number of 0,131,989,554.

The IP generation apparatus may determine whether the generated IP decimal number is less than a decimal number indicating the number of IP addresses that can be generated. To cover all the IP addresses that can be generated, the IP generation apparatus may initialize each of the second through $n^{th}$ slots to the maximum value of digits constituting a corresponding partial number. Therefore, a decimal number which is greater than or equal to the decimal number indicating the number of producible IP addresses can be generated. Since no IP address can be generated from such a decimal number, the IP generation apparatus may determine whether the generated IP decimal number is less than the decimal number indicating the number of IP addresses that can be generated and generate an IP address from the IP decimal number only when the IP decimal number is less than the decimal number indicating the number of IP addresses that can be generated. This part corresponds to lines (20) through (23) in FIG. 4.

Figure 10:
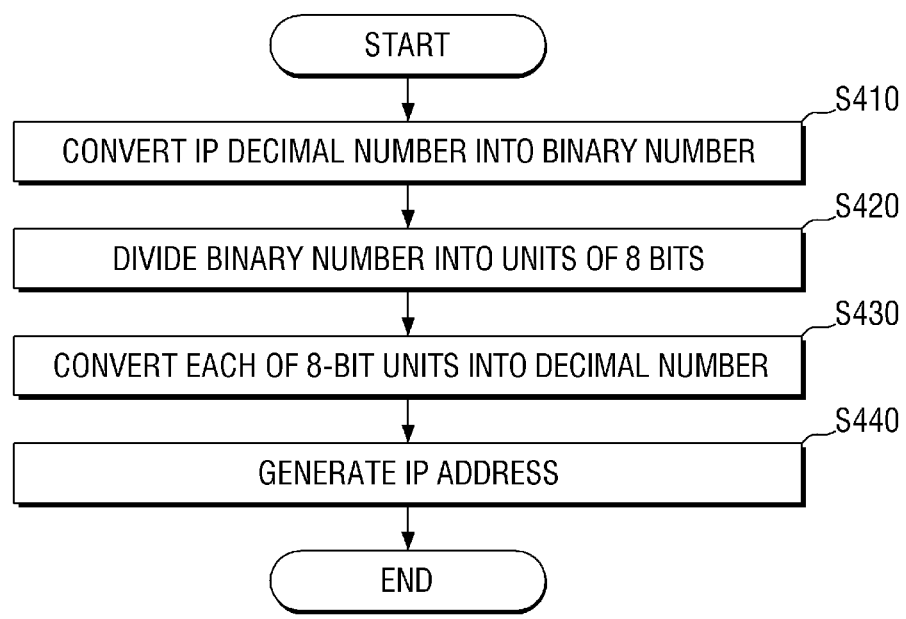
FIG. 10 is a flowchart illustrating a process of generating a random IP from an IP decimal number, which is referred to in some embodiments.
Figure 11:
FIG. 11 and FIG. 12 illustrate a process of generating a random IP, which is referred to in some embodiments.
Figure 11:
Figure 11:
Figure 11:
Figure 11:
Figure 11:
Figure 12:
Figure 12:
Figure 12:

A process in which the IP generation apparatus generates a random IP address from an IP decimal number will now be described with reference to FIGS. 10 through 12. FIG. 10 is a flowchart illustrating a process of generating a random IP from an IP decimal number, which is referred to in some embodiments. FIG. 11 and FIG. 12 illustrate a process of generating a random IP, which is referred to in some embodiments.

When an IP decimal number is generated, the IP generation apparatus may convert the IP decimal number into a binary number (operation S410). The IP generation apparatus may divide the binary number into units of 8 bits (operation S420) and convert each of the 8-bit units into a decimal number (operation S430). Using each decimal number as the number of one unit, the IP generation apparatus may generate an IP address having a total of four units (operation S440).

Referring to operation example 2 310 of FIG. 11, an IP decimal number of 4,294,697,295 cab be converted into a binary number of 11111111111111111111111111111111. If the binary number is divided into units of 8 bits, 11111111/11111111/11111111/11111111 is obtained. Then, an IP address of 255.255.255.255 can be generated by converting each of the 8-bit units of the binary number into a decimal number.

Referring to operation example 3 320 of FIG. 11, an IP decimal number of 2,130,771,713 can be converted into a binary number of 01111111000000001111111100000001. If the binary number is divided into units of 8 bits, 01111111/00000000/11111111/00000001 is obtained. Then, an IP address of 127.0.255.1 can be generated by converting each of the 8-bit units of the binary number into a decimal number.

An IP address for 0,132,989,554 generated in FIG. 9 will now be described with reference to FIG. 12. Referring to FIG. 12, 0,132,989,554 can be converted into a binary number of 1111110110101000010011110010. If the binary number is divided into units of 8 bits, 00000111/11101101/01000010/01110010 is obtained. Then, an IP address of 7.237.66.114 can be generated by converting each of the 8-bit units of the binary number into a decimal number.

In this way, the IP generation apparatus can generate different random IP addresses by changing a plurality of partial numbers. The number of random IP addresses that can be generated may be equal to the number of decimal numbers indicating the number of producible IP addresses. Therefore, the random IP address generation process may be performed as many times as the number of decimal numbers indicating the total number of IP addresses that can be generated.

IP decimal numbers are all different numbers, and a plurality of random IP addresses generated from the IP decimal numbers also have different address values. Therefore, since a number of different random IP addresses equal to the number of IP addresses that can be generated are generated, the IP coverage may be 100%.

As for time complexity, when the number of IP addresses that can be generated is N, the IP generation apparatus has a time complexity of O(N). For N IP addresses that can be generated, the IP generation apparatus has a total time complexity of O(N) because a constant time of O(1) is required to generate an IP address.

FIG. 13 is a table comparing the performance of a conventional algorithm and the performance of an IP generation method according to an embodiment.

Referring to FIG. 13, CPU utilization is almost the same, but memory usage is reduced by about $\frac{1}{10}$. In addition, the time required to generate all IP addresses is 15 minutes and 30 seconds on average in the case of the conventional algorithm, but is shortened to 13.53 seconds on average in the case of the inventive concept.

Therefore, it can be seen that an IP generation apparatus of the inventive concept has improved time and space efficiency as compared with the conventional algorithm.

The methods according to the embodiments described above can be performed by the execution of a computer program implemented as computer-readable code. The computer program may be transmitted from a first computing device to a second computing device through a network such as the Internet and may be installed in the second computing device and used in the second computing device. Examples of the first computing device and the second computing device include fixed computing devices such as a server, a physical server belonging to a server pool for a cloud service, and a desktop PC.

According to embodiments, an IP generation apparatus can generate IP addresses at random with reduced time and space complexity.

However, the effects of the embodiments are not restricted to the one set forth herein. The above and other effects of the embodiments will become more apparent to one of daily skill in the art to which the embodiments pertain by referencing the claims.

The concepts of the invention described above with reference to FIGS. 3 to 7 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An Internet protocol (IP) generation method performed by an IP generation apparatus comprising one or more processors and memory, and the method comprising:
    forming, by the processors of the IP generation apparatus, a plurality of initialized partial numbers by dividing a decimal number indicating a count of IP addresses that can be generated;
    changing, by the processors of the IP generation apparatus, the partial numbers according to a predetermined rule;
    generating, by the processors of the IP generation apparatus, an IP decimal number by linking the changed partial numbers;
    generating, by the processors of the IP generation apparatus, a random IP address from the IP decimal number; and
    generating, by the processors of the IP generation apparatus, a plurality of different random IP addresses with improved time efficiency, by sequentially repeating the changing of the partial numbers, the generating of the IP decimal number and the generating of the random IP address,
    wherein the forming of the initialized partial numbers comprises:
        dividing the decimal number indicating the count of IP addresses that can be generated into partial numbers of first through n-th slots in order of decreasing digits place;
        initializing each of the partial numbers of the second through n-th slots to a maximum value; and
        forming the initialized partial numbers comprising the partial number of the first slot and the initialized partial numbers of the second through n-th slots, n is a natural number of 2 or more,
    wherein the generating of the IP decimal number comprises:
        multiplying the partial numbers by a plurality of predetermined numbers, respectively; and
        generating the IP decimal number by adding the partial numbers multiplied by the predetermined numbers, and
    wherein the generating of the random IP address comprises:
        converting the IP decimal number into a binary number;
        dividing the binary number into a plurality of 8-bit units, starting from a first digit; and
        generating an IP address by converting each of the 8-bit units into a decimal number.

2. The method of claim 1, wherein the changing of the partial numbers according to the predetermined rule comprises reducing a partial number of only an m-th slot which is any one of the first through n-th slots, wherein 1≤m≤n.

3. The method of claim 2, wherein the reducing of the partial number of only the m-th slot comprises:
    reducing the partial number of the m-th slot if the partial number of the m-th slot can be reduced; and
    reinitializing the partial number of the m-th slot to an initialized partial number of the m-th slot, increasing m by 1, and then reducing the partial number of the m-th slot if the partial number of the m-th slot cannot be further reduced.

4. The method of claim 1, wherein the generating of the random IP address is performed when the IP decimal number is less than the decimal number indicating the count of IP addresses that can be generated.

5. The method of claim 1, wherein the generating of the random IP address is performed as many times as the count of IP addresses that can be generated.

6. An IP generation apparatus comprising:
    one or more processors;
    a memory which loads a computer program to be executed by the processors; and
    a storage,
    wherein the computer program comprises:
        an operation of forming a plurality of initialized partial numbers by dividing a decimal number indicating a count of IP addresses that can be generated;
        an operation of changing the partial numbers according to a predetermined rule;
        an operation of generating an IP decimal number by linking the changed partial numbers;
        an operation of generating a random IP address from the IP decimal number; and
    an operation of generating a plurality of different random IP addresses with improved time efficiency, by sequentially repeating the operation of changing the partial numbers, the operation of generating the IP decimal number and the operation of generating the random IP address,
    wherein the operation of forming of the initialized partial numbers comprises:
        an operation of dividing the decimal number indicating the count of IP addresses that can be generated into partial numbers of first through n-th slots in order of decreasing digits place;
        an operation of initializing each of the partial numbers of the second through n-th slots to a maximum value; and
        an operation of forming the initialized partial numbers comprising the partial number of the first slot and the initialized partial numbers of the second through n-th slots, n is a natural number of 2 or more,
    wherein the operation of generating of the IP decimal number comprises:
        an operation of multiplying the partial numbers by a plurality of predetermined numbers, respectively; and
        an operation of generating the IP decimal number by adding the partial numbers multiplied by the predetermined numbers, and
    wherein the operation of generating of the random IP address comprises:
        an operation of converting the IP decimal number into a binary number;
        an operation of dividing the binary number into a plurality of 8-bit units, starting from a first digit; and
        an operation of generating an IP address by converting each of the 8-bit units into a decimal number.

7. A non-transitory computer readable recording medium storing a computer program coupled to a computing device and executed to perform an IP generation method, the program being configured to perform operations of:
    forming a plurality of initialized partial numbers by dividing a decimal number indicating a count of IP addresses that can be generated;
    changing the partial numbers according to a predetermined rule;
    generating an IP decimal number by linking the changed partial numbers;
    generating a random IP address from the IP decimal number; and generating a plurality of different random IP addresses with improved time efficiency, by sequentially repeating the changing of the partial numbers, the generating of the IP decimal number and the generating of the random IP address, wherein the forming of the initialized partial numbers comprises:
  dividing the decimal number indicating the count of IP addresses that can be generated into partial numbers of first through n-th slots in order of decreasing digits place;
  initializing each of the partial numbers of the second through n-th slots to a maximum value; and
  forming the initialized partial numbers comprising the partial number of the first slot and the initialized partial numbers of the second through n-th slots, n is a natural number of 2 or more, wherein the generating of the IP decimal number comprises:
  multiplying the partial numbers by a plurality of predetermined numbers, respectively; and
  generating the IP decimal number by adding the partial numbers multiplied by the predetermined numbers, and wherein the generating of the random IP address comprises:
  converting the IP decimal number into a binary number;
  dividing the binary number into a plurality of 8-bit units, starting from a first digit; and
  generating an IP address by converting each of the 8-bit units into a decimal number.

\* \* \* \* \*